US010989730B2

(12) United States Patent
Corno et al.

(10) Patent No.: US 10,989,730 B2
(45) Date of Patent: Apr. 27, 2021

(54) DEVICE FOR DETERMINING THE ANGULAR SPEED OF A BICYCLE WHEEL AND THE PEDALING CADENCE APPLIED TO THE PEDALS OF SAID BICYCLE

(71) Applicant: BLUBRAKE S.R.L., Milan (IT)

(72) Inventors: Matteo Corno, Milan (IT); Simone Formentin, Busto Arsizio (IT); Gianmarco Rallo, Marsala (IT); Sergio Matteo Savaresi, Cremona (IT); Fabio Todeschini, Lecco (IT)

(73) Assignee: BLUBRAKE S.R.L., Milan (IT)

( * ) Notice: Subject to any disclaimer, the term of this patent is extended or adjusted under 35 U.S.C. 154(b) by 303 days.

(21) Appl. No.: 15/777,920

(22) PCT Filed: Jun. 28, 2016

(86) PCT No.: PCT/IB2016/053847
§ 371 (c)(1),
(2) Date: May 22, 2018

(87) PCT Pub. No.: WO2017/089904
PCT Pub. Date: Jun. 1, 2017

(65) Prior Publication Data
US 2018/0259546 A1 Sep. 13, 2018

(30) Foreign Application Priority Data

Nov. 24, 2015 (IT) .......................... UB2015A005838

(51) Int. Cl.
*G01P 3/487* (2006.01)
*G01P 3/489* (2006.01)
(Continued)

(52) U.S. Cl.
CPC .............. *G01P 3/487* (2013.01); *A63B 69/16* (2013.01); *B62J 99/00* (2013.01); *G01P 3/489* (2013.01);
(Continued)

(58) Field of Classification Search
CPC ........... G01P 3/487; G01P 3/489; A63B 69/16
See application file for complete search history.

(56) References Cited

U.S. PATENT DOCUMENTS

| 5,789,658 A | 8/1998 | Henn et al. | |
| 7,061,228 B2 * | 6/2006 | Ichida | B62M 25/08 324/174 |

(Continued)

FOREIGN PATENT DOCUMENTS

| DE | 10200900919 A1 | 8/2010 | |
| DE | 60032819 T3 * | 4/2013 | ............ B62M 6/50 |

(Continued)

OTHER PUBLICATIONS

Computer translation of DE60032819, downloaded from Espacenet on May 14, 2020 (Year: 2013).*

(Continued)

*Primary Examiner* — Gregory J Toatley, Jr.
*Assistant Examiner* — Lyudmila Zaykova-Feldman
(74) *Attorney, Agent, or Firm* — Manelli Selter PLLC; Edward Stemberger

(57) ABSTRACT

A device for determining a kinematic magnitude of a bicycle and a rate of the pedal-thrust exerted by a user on the pedals of the bicycle includes a sensor of the bicycle, adapted to be associated to the bicycle, suitable for detecting the bicycle kinematic magnitude ($\omega_i$) and for generating a signal representative of the bicycle kinematic magnitude; a filter connected to the sensor of the bicycle kinematic magnitude, configured for receiving at the input the signal representative (Continued)

of the bicycle kinematic magnitude ($\omega_i$) and for supplying, at the output, an optimized signal ($\omega_{opt}$) of the bicycle kinematic magnitude; and a module for the frequency-analysis of the optimized signal ($\omega_{opt}$) of the bicycle kinematic magnitude, connected to the filter.

9 Claims, 3 Drawing Sheets

(51) Int. Cl.
*G01P 21/02* (2006.01)
*A63B 69/16* (2006.01)
*B62J 99/00* (2020.01)
*B62J 45/40* (2020.01)

(52) U.S. Cl.
CPC .......... *G01P 21/02* (2013.01); *A63B 2220/20* (2013.01); *A63B 2220/34* (2013.01); *B60Y 2400/3032* (2013.01); *B62J 45/40* (2020.02)

(56) References Cited

U.S. PATENT DOCUMENTS

| | | | |
|---|---|---|---|
| 8,314,653 B1 * | 11/2012 | Granger-Jones | H03F 1/223 327/552 |
| 2013/0158369 A1 * | 6/2013 | Yuen | A61B 5/744 600/301 |
| 2016/0298983 A1 * | 10/2016 | Savchenko | B62J 99/00 |

FOREIGN PATENT DOCUMENTS

| | | | | |
|---|---|---|---|---|
| EP | 2433097 A1 | | 3/2012 | |
| WO | WO-0130643 A1 * | | 5/2001 | ............. B62M 6/55 |
| WO | WO-0201151 A1 * | | 1/2002 | ............. B60T 8/172 |
| WO | 2015128226 A1 | | 9/2015 | |

OTHER PUBLICATIONS

R. Bitmead et al. "A Kalman filtering approach to short-time Fourier analysis", IEEE Transactions on Acoustics, Speech and Signal Processing, vol. 34, No. 6, pp. 1493-1501, Dec. 1, 1986.
International Search Report & Written Opinion in PCT/IB2016/053847 dated Sep. 5, 2016..

* cited by examiner

DEVICE FOR DETERMINING THE ANGULAR SPEED OF A BICYCLE WHEEL AND THE PEDALING CADENCE APPLIED TO THE PEDALS OF SAID BICYCLE

TECHNICAL FIELD OF THE INVENTION

The object of the present invention is a device for determining the angular speed of a bicycle wheel and the pedaling cadence applied by a user to the pedals of said bicycle.

PRIOR ART

It is known that sensors are applied on bicycles for determining the angular speed of one of the wheels, in particular of the driving wheel, and for determining the pedaling cadence, i.e. the pedaling frequency applied to the bicycle pedals by the user. In general, the pedaling cadence and the driving wheel speed are proportional by a ratio, which depends on the gear ratio in use. If the ratio is fixed, knowing one of the two variables means knowing the other when the pedal is engaged (i.e. when a possible free-wheel mechanism, which makes the pedals and the wheel temporarily independent, does not operate). If, on the contrary, the gear ratio is variable, for determining one of the variables from the other, also the transmission ratio in use must be known.

In general, therefore, in order to measure both variables, it is necessary to provide separate detection sensors, respectively of the wheel speed and of the pedaling cadence. A separate installation of the two sensors on the bicycle is therefore necessary as well as their wiring to connect them with a common control unit. The presence of two sensors, besides making the bicycle heavier, is also costly in terms of configuration complexity and in terms of time. The cadence sensors, moreover, are very visible and therefore aesthetically unpleasant, since they are normally made of a first body (typically a magnet) associated to the pedal and of a second body associated to the bicycle frame.

Document WO 2015/128226 A1 describes a wearable device equipped with accelerometers. The pedaling cadence can be obtained, based on the measured filtered accelerations, Document EP 2 433 097 A1 describes an acceleration sensor applied to a bicycle having accelerometers, which determine the bicycle speed and its pedaling cadence.

Document DE 10 2009 000919 A1 describes a pedal-assisted bicycle with a speed sensor, whose signal is filtered.

Document U.S. Pat. No. 5,789,658 A describes an algorithm for correcting the tolerances of a speed sensor.

Document R. Bitmead et al. "A Kalman Filtering approach to short-time Fourier analysis" describes a Kalman filter.

SUMMARY OF THE INVENTION

The technical problem, at the basis of the present invention, is therefore to make available a device for determining a kinematic quantity of a bicycle, in particular the angular speed of a bicycle wheel, and its pedaling cadence. The device uses a single sensor, instead of two, and is consequently lightweight as a whole, easy to install, and of reduced visual impact.

This and other objects are achieved through a device for determining a kinematic quantity of a bicycle and the pedaling cadence applied by a user to the pedals of said bicycle according to claim 1.

The dependent claims define possible advantageous embodiments of the invention.

BRIEF DESCRIPTION OF THE FIGURES

To better understand the invention and appreciate its advantages, some of its non-limiting exemplary embodiments will be described below, referring to the attached figures, wherein.

DETAILED DESCRIPTION OF EMBODIMENTS OF THE INVENTION

Figure 1:
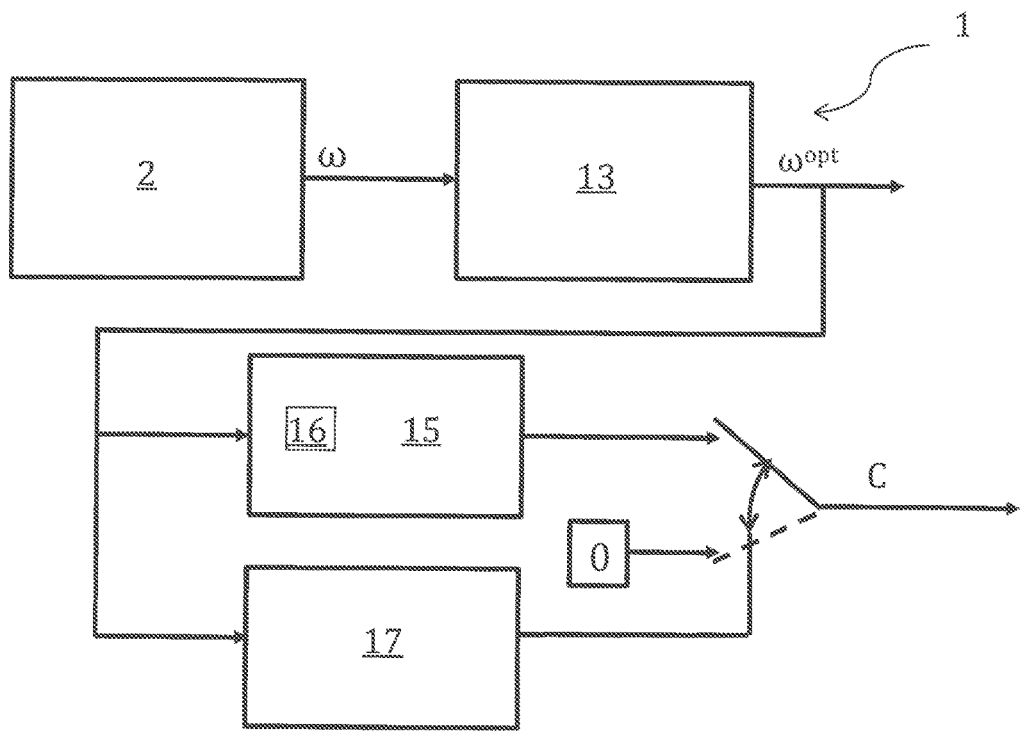
FIG. 1 is a block diagram of a device according to a possible embodiment of the invention.

With reference to the schematic illustration of FIG. 1, a device for determining the kinematic quantity of a bicycle and of the pedaling cadence applied by a user to the pedals of the bicycle itself is indicated as a whole with reference 1. In the present description, the angular speed of a bicycle wheel, in particular of one of its driving wheel, is taken into account by way of example. However, the device according to the invention may alternatively be configured for determining different kinematic quantities, such as, for example, the longitudinal acceleration or the lateral acceleration, and for extrapolating the pedaling cadence from signals representative of the same, made available by the corresponding sensors.

Device 1 comprises an angular speed sensor 2 adapted to be associated to said bicycle wheel, in particular to the driving wheel, usually the rear wheel, connected to the pedals via a transmission, comprising, for example, a chain transmission and preferably provided with a free-wheel mechanism. The transmission is in particular with variable ratios, so that the rider can change the transmission ratio between the pedals and the driving wheel. The speed sensor 2 is suitable for detecting the angular speed w of the wheel, to which it is associated, and for generating a signal representative of said speed.

Figure 2:
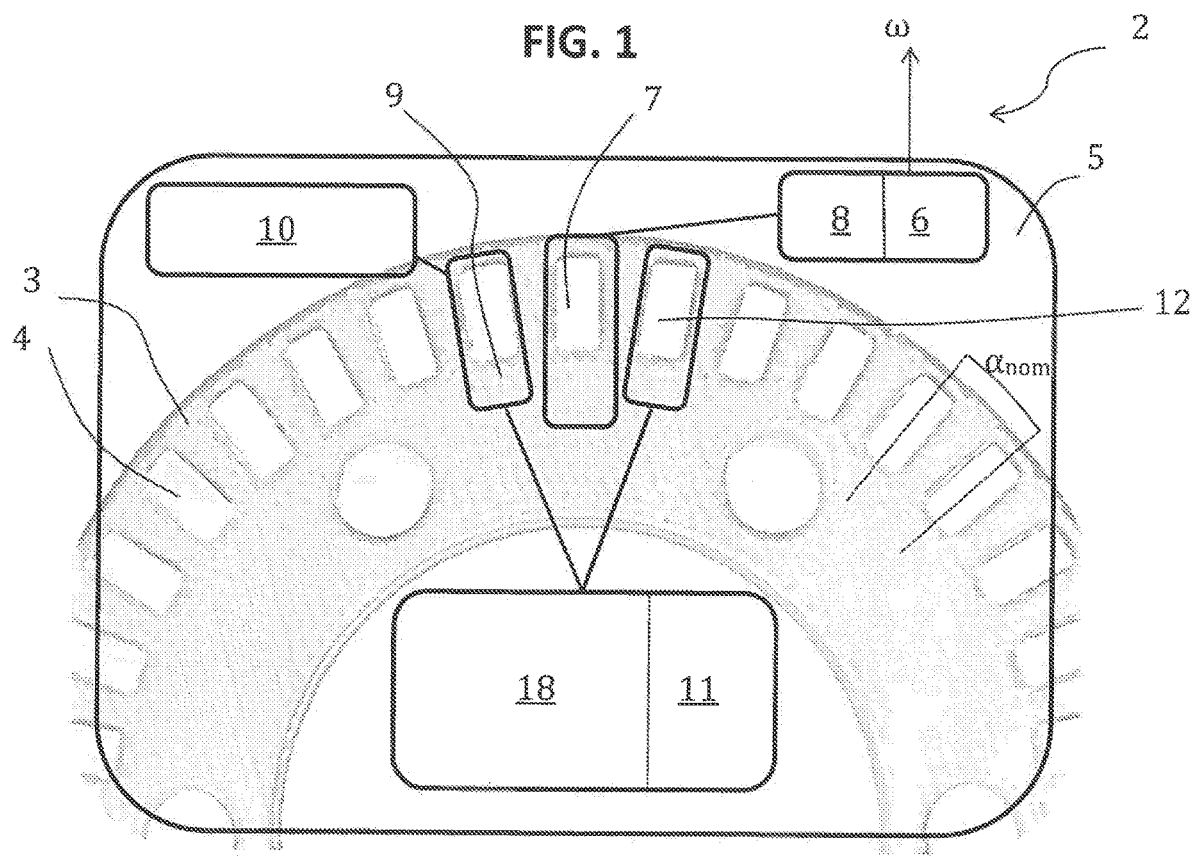
FIG. 2 is a schematic view, partially transparent, of an angular speed sensor of a bicycle wheel included in the device according to a possible embodiment of the invention.
Figure 3A:
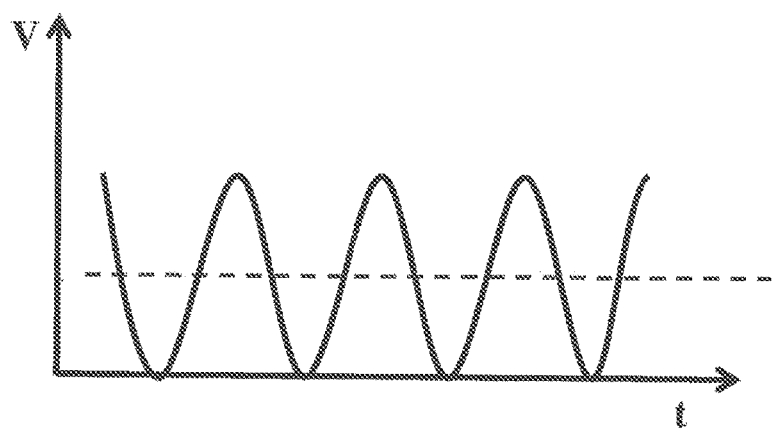
FIGS. 3a and 3b show respectively the trend of a possible output analog signal from the angular speed sensor of FIG. 2 and the trend of the same as a result of its digital conversion.
Figure 3B:
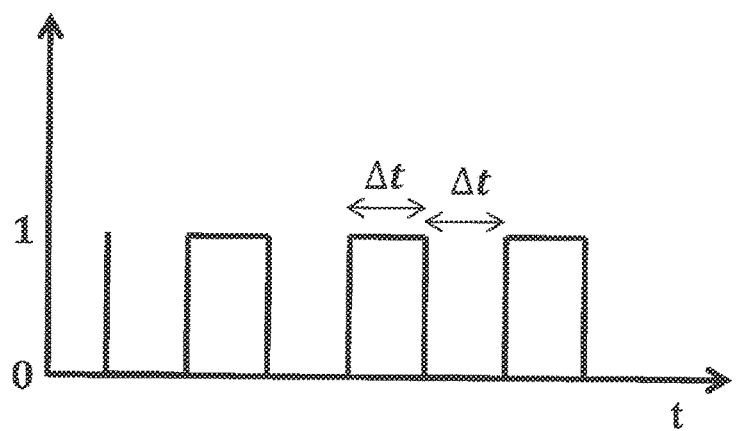

The speed sensor 2 can be variously configured. With reference to FIG. 2, according to a possible embodiment, the speed sensor 2 is an inductive sensor, comprising a phonic wheel 3 linked to the rotating wheel of the bicycle. For example, the phonic wheel 3 can be fixed to a wheel brake disc, if applicable, or to the spokes of the same. The phonic wheel 3 comprises in turn a set of permanent magnets 4, preferably of alternating polarity (i.e. wherein the North and the South are alternated), which are distributed in a substantially uniform manner along the circumference of the phonic wheel 3, for example fixed in slots or grooves in the same. The phonic wheel 3 further comprises a sensor body 5 intended to be linked to the bicycle frame, in particular for example to the fork, fixed to a rotating driving wheel. A Hall effect sensor 7 is associated to the sensor body 5. Said Hall effect sensor 7 is suitable for detecting the transit of each of the previously mentioned permanent magnets 4 near the Hall effect sensor 7 itself and for generating a signal, in particular an electric signal, representative of said transits. The orientation with alternating polarity of the permanent magnets 4, when used, allows the sensor 7 to distinguish the two possible rotation directions of the wheel (forward and backward). FIG. 3a shows a possible trend of the output (analog) voltage signal, generated by the Hall effect sensor 7 in the time domain. Advantageously, the speed sensor 5 further comprises an analog/digital converter module 8 which converts the analog signal of the Hall effect sensor 7 into a digital signal, which can take in time t the logical values 1 and 0, as shown in FIG. 3b. When the analog signal is below a predetermined threshold value (dotted line in FIG. 3a), the digital signal is 0, while, when the analog signal exceeds this value, the digital signal is 1. The time interval Δt during which the digital signal is 1 (and, similarly, the time interval Δt during which the digital signal is 0) indicates the time that elapses between the transit of two consecutive magnets over the Hall effect sensor 7. The speed sensor of FIG. 2 further comprises a control module 6 configured for determining the angular speed w of the wheel to which the speed sensor 2 itself is associated by the following formula:

$$\omega = \alpha_{nom}/\Delta t \quad (1)$$

wherein:

ω is the wheel angular speed expressed in rad/s;

$\alpha_{nom}$ is the nominal angular distance, assumed constant, between consecutive permanent magnets. If the number of permanent magnets is equal to L (and if, according to the preferred embodiment previously described, they have alternating polarity and if the time interval Δt, as previously defined, is acquired when the digital signal is 1 as well as when the signal is 0), said nominal angular distance, expressed in radians, is given by:

$$\alpha_{nom} = \frac{2\pi}{L} \quad (2)$$

The control module 6 of the speed sensor 2 provides, therefore, an output signal representative of the wheel angular speed ω, determined through the previously explained methods.

In accordance with a possible embodiment, the speed sensor 2 comprises an inductor 9 suitable for detecting the transit of one of the permanent magnets 4 and for generating an induced current consequent to the transit, as well as a switch-on module 10 configured for activating the speed sensor 2 as a result of the transit of a predetermined number of permanent magnets near the inductor 9.

In accordance with a possible embodiment, the angular speed sensor 2 comprises a battery 11 for supplying the sensor itself. Advantageously, the speed sensor 2 further comprises one or more auxiliary inductors 12 suitable for generating an induced current consequent to the transit of the permanent magnets 4 nearby, which can be exploited for recharging the battery 11 itself. The previously mentioned inductor 9 can be used itself as an auxiliary inductor for recharging the battery. Between the auxiliary inductors 12 and the battery 11, an appropriate electronic circuit 18 can be used for processing the electric current induced in the auxiliary inductors 12, so that this is suitable for supplying battery 11. Said electronic circuit may comprise, in particular, a rectifier and a power converter. The energy storage system described naturally causes a small resistant torque on the wheel itself, which, however, will be substantially irrelevant and almost imperceptible to the cyclist.

Note that, as an alternative to the phonic wheel speed sensor and to the Hall effect sensor, different speed sensors may be used generically comprising a moving part, fixed in rotation to the bicycle wheel and equipped with a set of reference elements linked with the moving part, and a fixed part associated to the bicycle frame, which in turn comprises elements for detecting the transits of such reference elements near the fixed part and for generating a signal representative of such transits, as well as a control module configured for determining the angular speed of the wheel and for generating the signal representative of the wheel angular speed based on said signal representative of such transits. For example, said type of speed sensor (not shown in the figures) may comprise an encoder, having a moving body equipped with a predefined number of notches, associated with the wheel, and an optical system for detecting and counting the notches that pass near the optical system.

Note also that, however, different kinds of speed sensors can be used, such as, for example, tachometric dynamos.

With reference again to FIG. 1, the device comprises a filter 13, which receives an input signal representative of the angular speed w of the bicycle wheel, provided by the speed sensor 2, and processes it, as described below, providing an output optimized signal $\omega^{opt}$ of the angular speed of the bicycle wheel. In particular, advantageously, the filter 13 is an adaptive filter, namely a system with a transfer function with variable parameters, which are adjusted according to an optimization algorithm. In literature various optimization algorithms of adaptive filters are known, in particular in order to eliminate noise or errors, which is the targeted application of the present invention, as explained below. The signal representative of the speed w of the bicycle wheel is subject to errors for many causes. One of such causes, if the speed sensor is, as previously described, a phonic wheel and a Hall effect sensor (or also similar, such as an encoder sensor or in general a sensor with a moving part having a set of discrete elements) is an imperfect distribution of the permanent magnets 4 along the circumference of the phonic wheel 3. In other words, the nominal angular distance between consecutive permanent magnets 4 $\alpha_{nom}$ is not actually constant, but varies between pairs of consecutive magnets. Different causes can be found, including for example: dimensional errors, wear, eccentricity of the rotation axis of the phonic wheel with respect to the rotation axis of the bicycle wheel. Said errors can also vary over time. Furthermore, each magnet may generate a magnetic field with different intensity, which may result in a sensor error fully equivalent to the geometrical error due to said non-uniform spatial distribution of the magnets. Therefore, the effective angular distance $\alpha_i$ between two consecutive magnets of the i-th pair of consecutive magnets can be expressed as follows:

$$\alpha_i = \alpha_{nom} + \vartheta_i \quad (3)$$

wherein $\vartheta_i$ is the error with respect to the nominal angular distance $\alpha_{nom}$ of the i-th pair of consecutive magnets. From (3) it follows that the effective speed of the wheel $\omega^{opt}$, determined from each pair of consecutive magnets, is given by:

$$\omega^{opt} = \frac{\alpha_i}{\Delta t_i} = \frac{\alpha_{nom} + \vartheta_i}{\Delta t_i} \quad (4)$$

wherein $\Delta t_i$ is the time that elapses between the transit, for example, of the first and second permanent magnets of the i-th pair of consecutive magnets near the Hall effect sensor 7.

Therefore, in order to determine the effective angular speed of rotation, the error value $\vartheta_i$ should be estimated for each pair of consecutive magnets. Said function is performed by the filter 13.

The filter 13 operates in the following manner. For each pair i of consecutive magnets an average speed $\hat{\omega}_i^0$ according to the revolution time $\Delta t_i^{rev}$ is estimated, i.e. according to the time that elapses between two consecutive transits near the Hall effect sensor:

$$\hat{\omega}_i^0 = \frac{2\pi}{\Delta t_i^{rev}} \quad (5)$$

Consequently, from the error $\hat{e}_t$ between the estimated average speed $\hat{\omega}_i^0$ and the rotation effective angular speed $\omega_i$ detected by the speed sensor with reference to the i-th pair of magnets, it is possible to estimate an error $\hat{\vartheta}_i$ with respect to the nominal angular distance $\alpha_{nom}$ of the i-th pair of consecutive magnets, as follows:

$$\hat{e}_i = \hat{\omega}_i^0 - \omega_i = \frac{\hat{\vartheta}_i}{\Delta t_i} \quad (6)$$

from which it follows that:

$$\hat{\vartheta}_i = \Delta t_i \cdot \hat{e}_i \quad (7)$$

These steps are repeated for each pair of consecutive magnets (i=1, 2, . . . L). The geometric condition is that the sum of the estimated errors 19, of all pairs of consecutive magnets is null, considering the geometry of the sensor. By inserting the estimated error $\hat{\vartheta}_i$ in (4), it is possible to determine the effective angular speed of the wheel $\omega^{opt}$.

Advantageously, in order to estimate the errors $\vartheta_i$ at further instants different from those, where the measurements of the revolution time $\Delta t_i^{rev}$ are taken, it is possible to use a recursive least square algorithm (known in the literature as "ReLS—Recursive Least Square").

In particular, considering the most recent measurements of the errors $\hat{\vartheta}_i$, an estimating function $\vartheta_i^*$, is determined so that the square error between the measured quantities $\hat{\vartheta}_i$ and the estimate $\vartheta_i^*$ is minimized (recursive least square algorithm). Said estimate is then recursively updated every time a new measurement error $\hat{\vartheta}_i$ is available (recursive least square algorithm). Preferably, it is possible to give less credit, for example by an appropriate coefficient, to the less recent measurements.

Note that, as the skilled person of this sector will understand clearly, the ReLS algorithm described above may have many variants or be replaced by alternative algorithms that substantially lead to the same result.

Note that the described algorithm is suitable for determining the angular errors $\vartheta_i$ even when they vary over time, for example due to the wear of the sensors themselves, as previously mentioned, thanks to the recursiveness and to the estimate adaptation made by the algorithm ReLS.

Figure 4A:
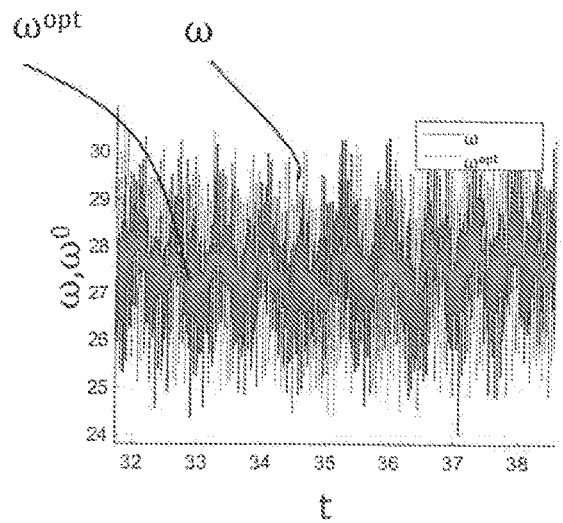
FIGS. 4a and 4b show a comparison between the measured and the optimized signals of the angular speed of the bicycle wheel, respectively, in time and in the frequency domain.
Figure 4B:
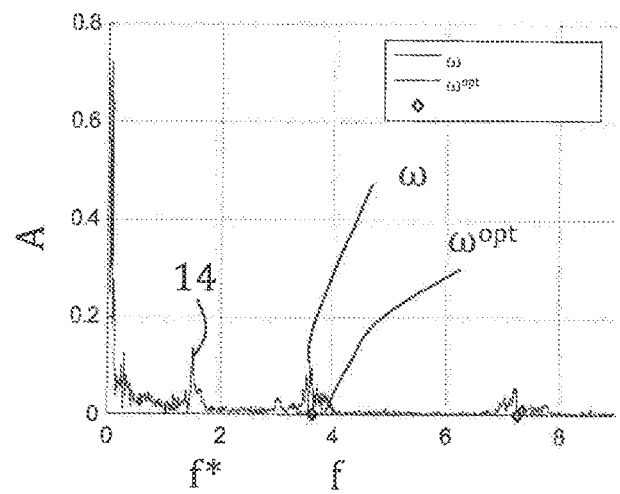

FIG. 4a shows a comparison in time t between the signal representative of the speed $\omega$, as generated by the speed sensor 2 in certain conditions, and the optimized signal representative of the speed $\omega^{opt}$, obtained from the same signal representing the speed $\omega$ by means of the adaptive filter 13 with the previously described methods. It is clear that the optimized signal representing the $\omega^{opt}$ speed is in general subject to a noise lower than the signal representing the speed $\omega$, not filtered in filter 13. The foregoing is also confirmed by the frequency analysis of the two signals (in a frequency f-amplitude A plane), shown in FIG. 4b. As it is evident, the signal representing the speed $\omega$ has frequencies mostly related to disturbances and not to the measured angular speed, absent in the optimized signal representing the speed $\omega^{opt}$, which are all multiples of the fundamental frequency of the wheel speed (indicated with dots).

Removing said frequencies allows estimating in a quite reliable way the pedaling cadence from the optimized signal representing the speed $\omega^{opt}$. Still referring to FIG. 4a, it is evident that the optimized speed $\omega^{opt}$ has an oscillatory trend with periodic peaks. This is due to the fact that the pedaling torque is not continuously applied because of the pedaling mechanics itself. In fact, the cyclist pedals exerting alternating pressure on the two pedals for a fraction of 360°. With reference again to FIG. 4b, according to what previously stated, it follows that the frequency f* corresponding to the peak indicated with the reference number 14 is just double the searched for pedaling cadence.

With reference again to FIG. 1, in order to determine such pedaling cadence (indicated in FIG. 1 with reference C), device 1 further comprises a module 15 for the frequency analysis of the optimized signal of the angular speed of the bicycle wheel $\omega^{opt}$. According to a possible embodiment, said module 15 comprises an extended Kalman filter, suitable for obtaining the searched for frequency.

The extended Kalman filter is an extension to nonlinear systems of the Kalman filter. The Kalman filter is a filter, which implements a recursive algorithm that solves the problem of optimal state estimation for discrete-time linear systems with additive white Gaussian noise, which acts on the state and on the output values.

In general, the Kalman filter uses a linear state representation of the system:

$$\underline{x}(k+1) = A\underline{x}(k) + B\underline{u}(k) + \underline{w}(k)$$

$$\underline{y}(k) = C\underline{x}(k) + D\underline{u}(k) + \underline{v}(k) \quad (8)$$

wherein:
k is the considered discrete instant;
$\underline{x}$ is the system state;
$\underline{u}$ is the considered input;
$\underline{y}$ is the output of the system;
$\underline{w}$ is the state disturbance;
$\underline{v}$ is the measurement disturbance.

The Kalman filter is suitable for determining by means of a recursive algorithm the value assumed by the state $\underline{x}$ at the current instant k, based on the knowledge of the actual input $\underline{u}$, of the actual output $\underline{y}$ and of the previous estimate of the state $\underline{x}$. The outputs $\underline{y}$ are connected to inputs $\underline{u}$ by a descriptive mathematical model of the system. It is therefore possible to recursively perform an estimate of the quantities of interest $\underline{x}$.

The extended Kalman filter is, as already stated, the extension of the Kalman filter to nonlinear systems, which, in general, requires a linearization of the system to bring it back to the conditions of unextended Kalman filter. In this case, it is possible to describe the system of interest, for example, as follows:

$$x_1(k+1) = x_1(k) \cdot \cos(x_3(k)) - x_2(k) \cdot \sin(x_3(k))$$

$$x_2(k+1) = x_1(k) \cdot \sin(x_3(k)) + x_2(k) \cdot \cos(x_3(k))$$

$$x_3(k+1) = (1-\varepsilon)x_3(k) + w(k)$$

$$y(k) = x_1(k) + v(k) \quad (9)$$

wherein:

k is the considered instant;

$x_3$ is the frequency to be determined, i.e. double the pedaling cadence C, recursively at every instant k, k+1 . . . ;

v(k) is the measurement noise, in this case the noise which acts on the optimized signal representing the angular speed $\omega^{opt}$ of the bicycle wheel, which is assumed to be a zero-mean Gaussian noise with variance r, to be defined in the calibration phase of the filter;

w(k) is the noise which acts on the frequency $x_3(k)$ at the instant k, which is assumed to be a zero-mean Gaussian noise with variance q, to be defined in the calibration phase of the filter too;

ε is an additional filter parameter, to be defined in the calibration phase too, which can be set, for example, to 0.

The extended Kalman filter is suitable for determining, by means of a recursive algorithm, the value assumed by the state $\underline{x}$, or x1, x2 and x3 starting from the output $\underline{y}$.

As an alternative to said method, it is possible to define and describe the system as follows:

$$x_1(k+1) = x_4(k)[x_1(k) \cdot \cos(x_3(k)u(k)) - x_2(k) \cdot \sin(x_3(k)u(k))]$$

$$x_2(k+1) = x_4(k)[x_1(k) \cdot \sin(x_3(k)u(k)) + x_2(k) \cdot \cos(x_3(k)u(k))]$$

$$x_3(k+1) = (1-\varepsilon_f)x_3(k) + w(k)$$

$$x_4(k+1) = (1-\varepsilon_a)x_4(k) + z(k)$$

$$y(k) = x_1(k) + v(k) \quad (10)$$

According to the model of (10), the frequency to be determined, linked to the pedaling cadence C, is no longer a state variable. In this case, in fact, the state $x_3$ to be determined corresponds to double the transmission ratio of the bicycle gear, and the input $\underline{u}$, missing in the system (9)—represents the angular speed of the wheel expressed in rad/s.

The frequency of interest is then determined as the product of the state $x_3$ by the input u. Moreover, according to this model, a further state variable $x_4$ is introduced, representing the signal amplitude whose frequency must be determined. z is the noise acting on said state variable, while $\varepsilon_a$ and $\varepsilon_e$ are calibration parameters of the filter. $X_1$ and $x_2$, as in the case of the model (9), represent the phase and quadrature components of the signal whose frequency must be estimated.

Certainly, there are further possible models to describe the system at the basis of the Kalman filter, with respect to the previously described models used by way of example.

Figure 5:
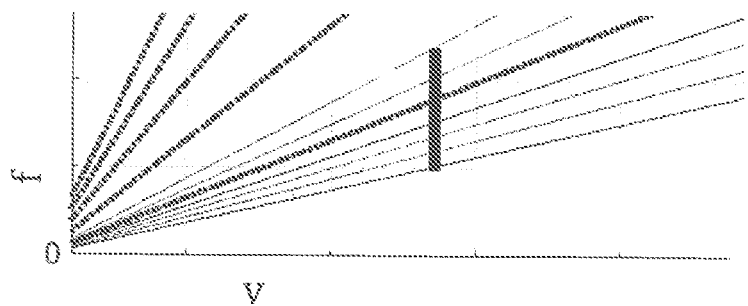
FIG. 5 shows a possible trend of the frequencies related to the pedaling cadence as a function of the bicycle speed and of the different gear ratios in use.

Preferably, the module 15 for the frequency analysis further comprises a band-pass filter 16 suitable for filtering the optimized signal of the angular speed of the bicycle wheel in a predetermined frequency band dependent on the detected speed of the bicycle wheel. As shown in FIG. 5, in fact, depending on the bicycle speed, the searched for frequency f, which is, as stated, double the pedaling cadence C, is included in a predetermined range. The shown straight lines link the pedaling cadence C with the bicycle speed v (obtainable from the angular speed of the wheel and from its radius), as functions of the set transmission ratio, which is however unknown. FIG. 5 also shows in dashed lines the multiples of the fundamental frequency of the bicycle wheel, which, however, can be eliminated thanks to the filter 13.

Referring again to FIG. 1, according to a possible embodiment, device 1 comprises a module 17 for detecting the free wheel condition of the bicycle. In bicycles, normally, the set of sprockets associated to the driving wheel, through which the chain, in turn driven by the pedals, transmits motion to the driving wheel itself, is associated to the latter by means of a free-wheel mechanism. Said mechanism allows the driving wheel to turn even when pedals are still (for example when the bicycle is traveling downhill) or to rotate backwards. In this condition, of course, the wheel speed is not related with the pedaling cadence. The module 17 is configured for determining the free wheel condition and for providing an output null value of the pedaling cadence, which replaces the value normally determined by module 15, in such free wheel conditions. When, on the contrary, the bicycle is subject to pedaling, its pedaling cadence is determined by such methods.

In order to determine the free wheel condition, various methods can be used. According to a possible method, the pedaling cadence or the transmission ratio are determined as explained with reference to (9) and (10). They tend towards zero in a free wheel condition. Setting a predefined threshold value for said quantities (or for their variation), a borderline between the free wheel condition and the pedaling condition can be drawn.

From the above description the skilled person will appreciate that device according to the invention enables to determine the speed and pedaling cadence using only a single sensor, namely the speed sensor. This allows using lighter components and an easier assembly in comparison with known solutions, where two separate sensors are necessary.

Note that, although the operation of device 1 according to the invention has been described referring to a sensor for detecting the angular speed of the bicycle driving wheel, device 1 may alternatively comprise a sensor, adapted to be fixed to the bicycle itself, configured for detecting a kinematic quantity of the bicycle, different in nature with respect to the angular speed of the bicycle wheel, and for providing a signal representing the same. For example, device 1 may comprise a longitudinal or lateral acceleration sensor, suitable for generating a signal representing the same. Said signal can be processed in a filter 13, suitable for identifying possible errors, so that an optimized signal can be obtained. The latter can be used as input of the module 15, which carries out a frequency analysis leading to the estimation of the pedaling cadence, following the methods described with reference to the wheel angular speed.

The skilled person, in order to satisfy specific contingent requirements, may make several additions, modifications or replacements of elements with others functionally equivalent to the embodiments of the device described so far, without however departing from the scope of the appended claims.

The invention claimed is:

1. Device for determining an angular speed of a bicycle wheel and a pedaling cadence applied by a user to the pedals of said bicycle, said device comprising:
   a sensor of said angular speed of the bicycle wheel, adapted to be coupled to said bicycle wheel, suitable for detecting said angular speed of the bicycle wheel ($\omega_i$) and for generating a signal representative of said angular speed of the bicycle wheel, wherein said sensor of the angular speed of the bicycle wheel comprises: a moving part, adapted to be rotatively integral with the wheel of the bicycle and provided with a plurality of reference elements integral with the moving part; a fixed part adapted to be associated to a bicycle frame, comprising means for detecting the transits of said reference elements near the detecting means and for generating a signal representing said transits; a control module configured for determining said angular speed of the bicycle wheel ($\omega_i$) and for generating said signal representing the angular speed of the bicycle wheel, based on said signal representing said transits;

a filter connected to said sensor of the angular speed of the bicycle wheel, configured for receiving at the input said signal representative of the angular speed of the bicycle wheel ($\omega_i$) and for supplying at the output an optimized signal ($\omega^{opt}$) of the angular speed of the bicycle wheel obtained by eliminating from the signal representative of the angular speed of the bicycle wheel ($\omega_i$) estimated errors ($\vartheta_i$) correlated to the structure of said sensor of the angular speed of the bicycle wheel, wherein said filter is configured for estimating an angular error ($\hat{\vartheta}_i$) for each couple of reference elements of said plurality of reference elements integral with the moving part of the angular speed sensor from said signal representing the angular speed of the wheel ($\omega_i$) and from an average speed ($\hat{\omega}_i^0$) estimated based on the time of revolution ($\Delta t_i^{rev}$) of said couple of reference elements, the optimized signal of the angular speed of the bicycle wheel ($\omega^{opt}$) being obtained from said estimated angular error ($\hat{\vartheta}_i$);

a module for the frequency analysis of said optimized signal ($\omega^{opt}$) of the angular speed of the bicycle wheel connected to said filter, configured for determining said pedaling cadence based on the frequency analysis of said optimized signal ($\omega^{opt}$) of the angular speed of the bicycle wheel and for supplying a signal representative of said pedaling cadence (C).

2. Device according to claim 1, wherein said sensor of the angular speed of the bicycle wheel is an inductive sensor comprising a phonic wheel, adapted to be rotatably integral with the rotating wheel of the bicycle and provided with a plurality of permanent magnets, substantially uniformly distributed on the circumference of the phonic wheel, and a sensor body, adapted to be integral with the bicycle frame, comprising a Hall effect sensor suitable for detecting the transits of said permanent magnets near said Hall effect sensor and for generating a signal representative of said transits.

3. Device according to claim 2, wherein said sensor of the angular speed of the bicycle wheel comprises a battery and at least one auxiliary inductor, suitable for supplying an induced supply current to said battery, generated as an effect of the movement of said permanent magnets with respect to said auxiliary inductor.

4. Device according to claim 1, wherein said filter is an adaptive filter implementing a recursive least squares algorithm for the recursive estimate of said angular error ($\vartheta_i^*$).

5. Device according to claim 1, wherein said module for the frequency analysis comprises an extended Kalman filter for determining the pedaling cadence (C), based on said optimized signal ($\omega^{opt}$) of the angular speed of the bicycle wheel.

6. Device according to claim 1, wherein said frequency analysis module comprises an extended Kalman filter for determining the transmission ratio, based on said optimized signal ($\omega^{opt}$) of the angular speed of the bicycle wheel, wherein said pedaling cadence (C) is determined based on said transmission ratio determined by the extended Kalman filter.

7. Device according to claim 1, wherein said frequency analysis module comprises a band-pass filter, adapted to filter the optimized signal ($\omega^{opt}$) of the angular speed of the bicycle wheel in a predetermined frequency band.

8. Device (1) according to claim 1, further comprising a module for determining the free wheel condition, configured for supplying a signal representative of the pedaling cadence null, which replaces the signal representative of the pedaling cadence supplied by the frequency analysis module of said optimized signal of the angular speed of the bicycle wheel, in the presence of said free wheel condition.

9. Bicycle comprising a device according to claim 1.

* * * * *